United States Patent
Batchu et al.

(10) Patent No.: US 11,861,563 B2
(45) Date of Patent: Jan. 2, 2024

(54) BUSINESS EMAIL COMPROMISE DETECTION SYSTEM

(71) Applicant: CLOUDFLARE, INC., San Francisco, CA (US)

(72) Inventors: Umalatha Batchu, Cupertino, CA (US); Torsten Zeppenfeld, Emerald Hills, CA (US); Blake Darche, Finksburg, MD (US); Philip Syme, Ellicott City, MD (US)

(73) Assignee: CLOUDFLARE, INC., San Francisco, CA (US)

( * ) Notice: Subject to any disclaimer, the term of this patent is extended or adjusted under 35 U.S.C. 154(b) by 528 days.

(21) Appl. No.: 17/150,853

(22) Filed: Jan. 15, 2021

(65) Prior Publication Data

US 2022/0230142 A1    Jul. 21, 2022

(51) Int. Cl.

| G06Q 10/107 | (2023.01) |
| H04L 9/40 | (2022.01) |
| G06Q 30/018 | (2023.01) |
| G06Q 40/02 | (2023.01) |
| G06F 40/205 | (2020.01) |
| G06N 7/01 | (2023.01) |

(52) U.S. Cl.
CPC ........ *G06Q 10/107* (2013.01); *G06F 40/205* (2020.01); *G06N 7/01* (2023.01); *G06Q 30/018* (2013.01); *G06Q 40/02* (2013.01); *H04L 63/1416* (2013.01); *H04L 63/1425* (2013.01)

(58) Field of Classification Search
CPC ............ H04L 63/1416; H04L 63/1425; H04L 63/1483; G06Q 10/107
See application file for complete search history.

(56) References Cited

U.S. PATENT DOCUMENTS

| 9,912,677 | B2 * | 3/2018 | Chien | .................... G06Q 30/06 |
| 10,050,998 | B1 * | 8/2018 | Singh | .................... H04L 63/145 |
| 10,135,766 | B2 * | 11/2018 | Ciancio-Bunch | ..... H04L 51/212 |
| 10,277,628 | B1 * | 4/2019 | Jakobsson | ............. H04L 51/212 |
| 10,515,214 | B1 * | 12/2019 | Vincent | ................. G06F 21/562 |
| 10,972,484 | B1 * | 4/2021 | Swackhamer | ...... H04L 63/1416 |
| 11,049,402 | B2 * | 6/2021 | Mondello | ............ G05D 1/0293 |
| 11,050,698 | B1 * | 6/2021 | Batchu | .................... H04L 51/42 |
| 11,388,188 | B2 * | 7/2022 | Ahluwalia | ............ H04L 63/105 |
| 11,647,034 | B2 * | 5/2023 | Levin | .................... H04L 63/107 726/23 |

(Continued)

*Primary Examiner* — Viral S Lakhia
(74) *Attorney, Agent, or Firm* — NICHOLSON DE VOS WEBSTER & ELLIOTT LLP

(57) ABSTRACT

In an embodiment, the disclosed technologies monitor electronic message traffic between a network and a recipient computer system. An embodiment includes obtaining, from an electronic message received from the network, a triple of a display name, email address, and sending domain, determining a name score for triple, and determining characteristics of the electronic message. The name score of the triple and the characteristics of the electronic message may be used to determine whether the electronic message is a spoofing attack such as a business email compromise (BEC) attack. In response to determining that the electronic message is malicious, an embodiment may cause the network to at least one of modify, delay, re-route, or block transmission of the electronic message to the recipient computer system.

17 Claims, 5 Drawing Sheets

(56) References Cited

U.S. PATENT DOCUMENTS

| | | | |
|---|---|---|---|
| 2020/0014711 A1* | 1/2020 | Rego | H04L 43/045 |
| 2020/0366712 A1* | 11/2020 | Onut | H04L 63/1483 |
| 2020/0396258 A1* | 12/2020 | Jeyakumar | H04L 63/1433 |
| 2021/0281606 A1* | 9/2021 | Singh | H04L 63/1483 |
| 2021/0295179 A1* | 9/2021 | Eyal Altman | G06N 5/04 |

* cited by examiner

BUSINESS EMAIL COMPROMISE DETECTION SYSTEM

TECHNICAL FIELD

One technical field of the present disclosure is computer security, specifically computer-implemented processes and computer systems that are programmed to detect malicious electronic mail, phishing, or malware. Another technical field is business email compromise detection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business email compromise (BEC) email attacks, also known as man-in-the-email attacks, are a type of phishing scam. BEC attackers exploit the fact that emails are frequently used to conduct both personal and professional business. A BEC email impersonates a trusted business partner of the email recipient or an individual who is trusted by the email recipient, with the goal of defrauding the recipient. BEC emails often include fake invoices and bills, fake requests to send money or non-currency forms of monetary value such as gift cards, or fake requests to disclose sensitive information.

A BEC attacker may target a particular recipient who may be an individual or an employee of a large organization. The BEC attacker may obtain legitimate email addresses of employees, officers, or directors from public sources. For example, a nonprofit corporation, seeking to provide transparency to the public, might publish a directory of officers such as President, Vice President, Treasurer, and so forth, with real names and email addresses at the organization. Through a grooming period of email exchanges, the BEC attacker builds trust with the targeted recipient such that when the BEC attacker finally sends the targeted recipient an email that requests something of value, such as money, a non-currency funds transfer, or sensitive information, the targeted recipient has been led to believe that they have been communicating with one of their normal business partners and are sending the requested item to a familiar account as part of a normal routine.

BEC attackers are often highly sophisticated enterprises. If the fraud attempt succeeds and is not discovered quickly, the fraudulently obtained asset is often hard to recover because it already has been filtered through other accounts that are difficult to trace.

While business losses from the foregoing can be thousands to millions of dollars or other denomination, the relevant technical problem is that email messages of the types described above can pass through existing mail transfer agents, malware filters, firewalls, and other devices or software without being blocked, flagged, or held in a quarantine. The electronic digital transmission of such a message into an enterprise network, alone, is a technical problem because the message consumes technical resources such as CPU cycles, storage, memory, and network bandwidth that do not need to be used. Existing computer security tools are believed to be inadequate to address the foregoing problems and there is an acute need in the computer security field for a technical solution to the problem of detecting and blocking email messages that constitute BEC attacks.

DETAILED DESCRIPTION

Figure 1:
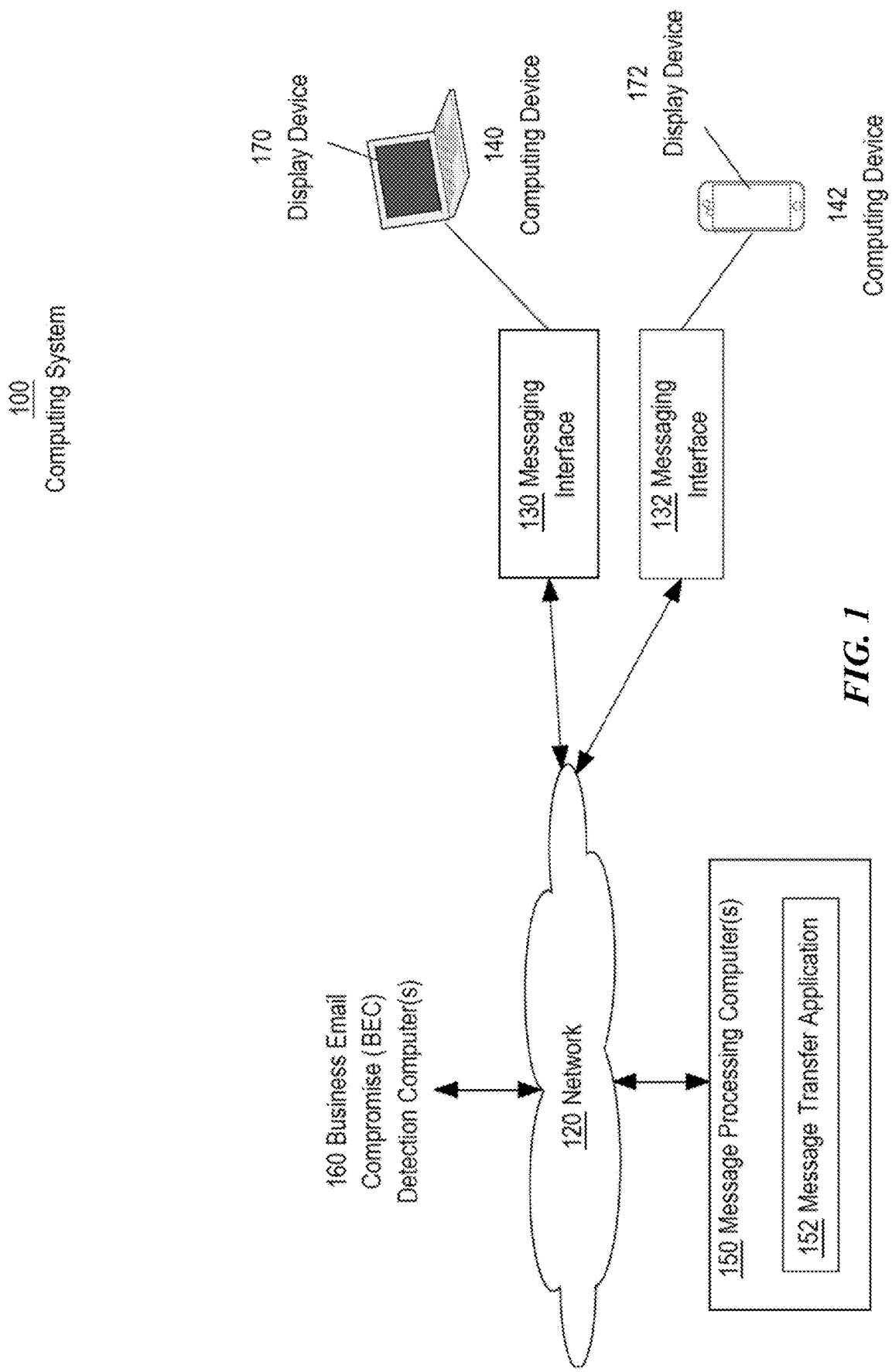
FIG. 1 is a block diagram that depicts an example networked computing system, in an embodiment.

This detailed description refers to the different drawings by specifying the numbers of the figures, and to the different parts by the use of reference numerals. While specific embodiments are described, the subject matter regarded as an invention is particularly pointed out by the appended claims and need not be limited by the details of the described embodiments. Embodiments are described herein in sections according to the following outline:

1. GENERAL OVERVIEW
2. STRUCTURAL OVERVIEW
2.1 EXAMPLE COMPUTING SYSTEM
2.2 EXAMPLE MESSAGING SYSTEM ARCHITECTURE
2.3 EXAMPLE OF BEC DETECTION ARCHITECTURE
2.4 MESSAGE PRE-PROCESSOR
2.5 LEGITIMATE DISPLAY NAME PROCESSOR
2.6 CLASSIFICATION PROCESSOR
2.7 RULES ENGINE
3. EXAMPLE OF COMPRISE DETECTION SYSTEM PROCESS
4. IMPLEMENTATION EXAMPLE—HARDWARE OVERVIEW
5. EXTENSIONS AND ALTERNATIVES; BENEFITS AND IMPROVEMENTS

1. General Overview

BEC attacks are extremely difficult to detect in a large volume of email traffic. In comparison to spam, which is very common and even voluminous, BEC email attacks are only rarely launched against a target organization. BEC emails are also hard to detect because they are engineered to appear as authentic as possible.

A distinguishing feature of a BEC email is the use of domain spoofing. For example, a company's legitimate business partner, John Doe, may have an email domain name of baysidelegal.com. A BEC attack may use a similar but slightly different domain name, such as baysideslegal.com, which only differs from the legitimate domain by one character. The BEC attack may further use display name and/or email address that appear to be legitimate along with the illegitimate domain name, for example, <John Doe> johndoe@baysideslegal.com. As it can be seen in the example, BEC attacks can be hard to notice, particularly if the email traffic includes frequent, routine, legitimate email exchanges with individuals with familiar email domain, e.g., baysidelegal.com.

In some scenarios, an attacker breaches security, perhaps by hijacking a user's password, and obtains control of an email account associated with a business entity. The attacker monitors the compromised email account to identify commonly seen sending domains. The attacker conducts what appear to be legitimate email communications using one of the commonly seen sending domains, such as the domain of a business partner with whom the owner of the compromised account is very familiar. After a few reply threads, the attacker switches the sending domain to divert the email conversation to the spoofed domain. The attacker's final email uses the spoofed domain to conduct the phishing attempt, for example by attaching a fake invoice to the email, which the attacker hopes the user will agree to pay.

Other scenarios involve legitimate businesses that rely heavily on email messaging to attract users' attention. These businesses often create many different sending domains in order to avoid spam filters. The sending domains often look like spoofing but are all associated with the same legitimate business. In these scenarios, the technical challenge is to accurately filter out spam while at the same time distinguishing spam from dangerous phishing attempts.

The spoofed email domain is under full control of the attacker and appears legitimate to all known technical approaches. The attacker may go to great lengths to make the email domain look legitimate, including having the malicious email server use an authentic TLS (Transport Layer Security) certificate, sending the email with high grade encryption, and adding strict SPF (Sender Policy Framework), DKIM, (DomainKeys Identified Mail) and DMARC (Domain-based Message Authentication) entries to the malicious email server so that email authentication algorithms are satisfied even though the domain is spoofed.

Existing technical approaches apply name matching heuristics or SMTP (Simple Mail Transfer Protocol) to try to detect BEC emails. The existing technical approaches have been unsuccessful chiefly because it is hard for systems to anticipate all potential lookalike domains for any given legitimate domain. The problem multiplies with every additional legitimate domain. Existing technical approaches often fail when organizations use email to communicate with many different business partners. As a result, many organizations simply recommend training employees to better spot BEC attacks themselves.

Anti-phishing methods that rely solely on lookalike detection methods are often over-inclusive in that even legitimate communications are flagged, resulting in many false positives. False positives detract from the user experience and also negatively affect the user's level of trust with the anti-phishing system. Thus, a technical challenge is to reduce false positives while still detecting and appropriately handling actual phishing messages.

Anti-phishing methods that rely on static whitelists or blacklists are often underinclusive because the whitelists or blacklists cannot be updated quickly enough to keep pace with the attackers. Thus, a technical challenge is to continue detecting and appropriately handling actual phishing messages as attackers continue to change their tactics.

The disclosed technologies address the above and other technical problems and challenges. Embodiments are structured and programmed to dynamically build and maintain a list of legitimate domains based on message traffic between a network and a particular recipient system. Incoming sender domains are compared to domains on the legitimate domain list and assigned a lookalike score. Natural language processing (NLP) techniques are used to extract message data from incoming messages. The message data is used by a set of machine-learned classifiers to classify an incoming message as having or not having particular characteristics. Classification data produced by the machine-learned classifiers is used along with the lookalike score to determine whether a particular message represents a phishing attack, such as a BEC attack or another form of spoofing attack.

The disclosed technologies remove the difficult burden of spotting BEC emails from the end users. Embodiments combine machine learning-based techniques with one or more other computations in order to improve automatic BEC attack detection while reducing false positives, particularly in systems that process high volumes of email traffic.

While this disclosure describes the invention in the context of an electronic message application, aspects of the disclosed technologies are equally useful in other applications, such as any application that may benefit from machine learning-based classification of domain data, whether or not the domain data is contained in an email address. The disclosed technologies are applicable to any type of electronic document or message from which domain data can be extracted. In addition, embodiments of the disclosed technologies are not limited to BEC email detection and may be configured to detect other types of spoofing attacks.

2. Structural Overview

2.1 Example Computing System

FIG. 1 is a block diagram that depicts an example computing system. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of detecting and responding to business email compromise attacks. All embodiments of the claims are directed to stored program digital computers, and computer-executed operating methods, that act to admit or deny admission of specified kinds of digital electronic email messages to, toward, or through computer networks, firewalls, routers, switches, server computers, or end-user computing devices, using digital electronic means. The admission or blockage of a digital electronic email message in connection with networking gear using the means set forth herein is not capable of human performance. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, the computing system 100 is arranged to operate messaging interfaces 130, 132, message processing computer(s) 150, and business email compromise (BEC) detection computer(s) 160, in the transmission of electronic messages from upstream computers to downstream computers. Examples of upstream and downstream computers include sender computers from which electronic messages may originate and recipient computers that may receive electronic messages. For example, computing devices 140, 142 may operate as upstream and/or downstream computers via an electronic communications network 120. Business email compromise (BEC) detection computer(s) 160, computing devices 140, 142, and message processing computer(s) 150 are communicatively coupled to the electronic communications network 120 via for example wired, wireless, and/or optical connections. Display devices 170, 172 are communicatively coupled to computing devices 140, 142, respectively.

Implemented in the computing devices 110, 140, 142, 150, 160 using computer software, hardware, or software and hardware, are processor-executable instructions, data structures, and digital data, stored in memory, which cooperate to provide the computer-implemented functionality described herein. For ease of discussion, these computer-implemented components are represented schematically in the figures that follow, which are described in detail below.

"System" as used herein may refer to a single computer or network of computers and/or other devices. "Computer" or "computing device" as used herein may refer to a computer or any other electronic device that is equipped with a processor. "Processor" as used herein may refer to a software or hardware processor. "Instructions" or "application" as used herein may refer to one or more sets of computer program instructions; in all cases, elements of instructions are capable of computer execution or evaluation to generate output based upon a computer transformation of an input dataset into different digitally stored, electronic data.

"Model" as used herein may refer to one or more sets of computer program instructions and datasets that collectively define representations data, relationships between data or rules or transformations of other data. For example, a model is capable of computer execution or evaluation to generate output that indicates a probabilistic or statistical likelihood that an input or a set of inputs is associated with a particular class, category, type or other characterization.

Although computing system 100 may be implemented with any number of the described components, in this disclosure, these elements may be referred to in the singular form for ease of discussion. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In an embodiment, each of computing devices 140, 142 is a client-side computing device or set of cooperating computing devices, such as a smart phone, tablet computer, wearable or body-mounted device, smart appliance, laptop machine, or combination of any of such devices. In an embodiment, computer(s) 150, 160 are each a server-side computing device such as a server computer or a cluster or network of server computers accessible by the Internet, for example in a public or private cloud. In some embodiments, computer(s) 150, 160 are the same computers or are part of the same computer system. As illustrated in FIG. 1, each of display devices 170, 172 is implemented as part of a computing device 140, 142, respectively, but may be implemented as a separate device or as part of another device, or as multiple networked display devices, in other implementations. Portions of processing described as performed by computer(s) 150 or computer(s) 160 may, in some embodiments, be performed by one or more of computing devices 140, 142.

Messaging interfaces 130, 132 are each client-side messaging software such as a mail client or a messaging application, which reside in memory of computing devices 140, 142, respectively. Malware attacks and other security risks can occur during the transmission of messages or during the download of electronic content from the Internet. Thus, in some embodiments, a message may refer to an electronic file that is downloaded from network 120 to computing devices 140, 142 via messaging interfaces 130, 132. As such, messaging interfaces 130, 132 may be implemented as any type of client-side software applications that are configured to display visual content, such as web browsers, search engines, web-based applications, social media applications. Portions of messaging interfaces 130, 132 may be hosted by a hosting computer (not shown) on the network 120.

Figure 5:
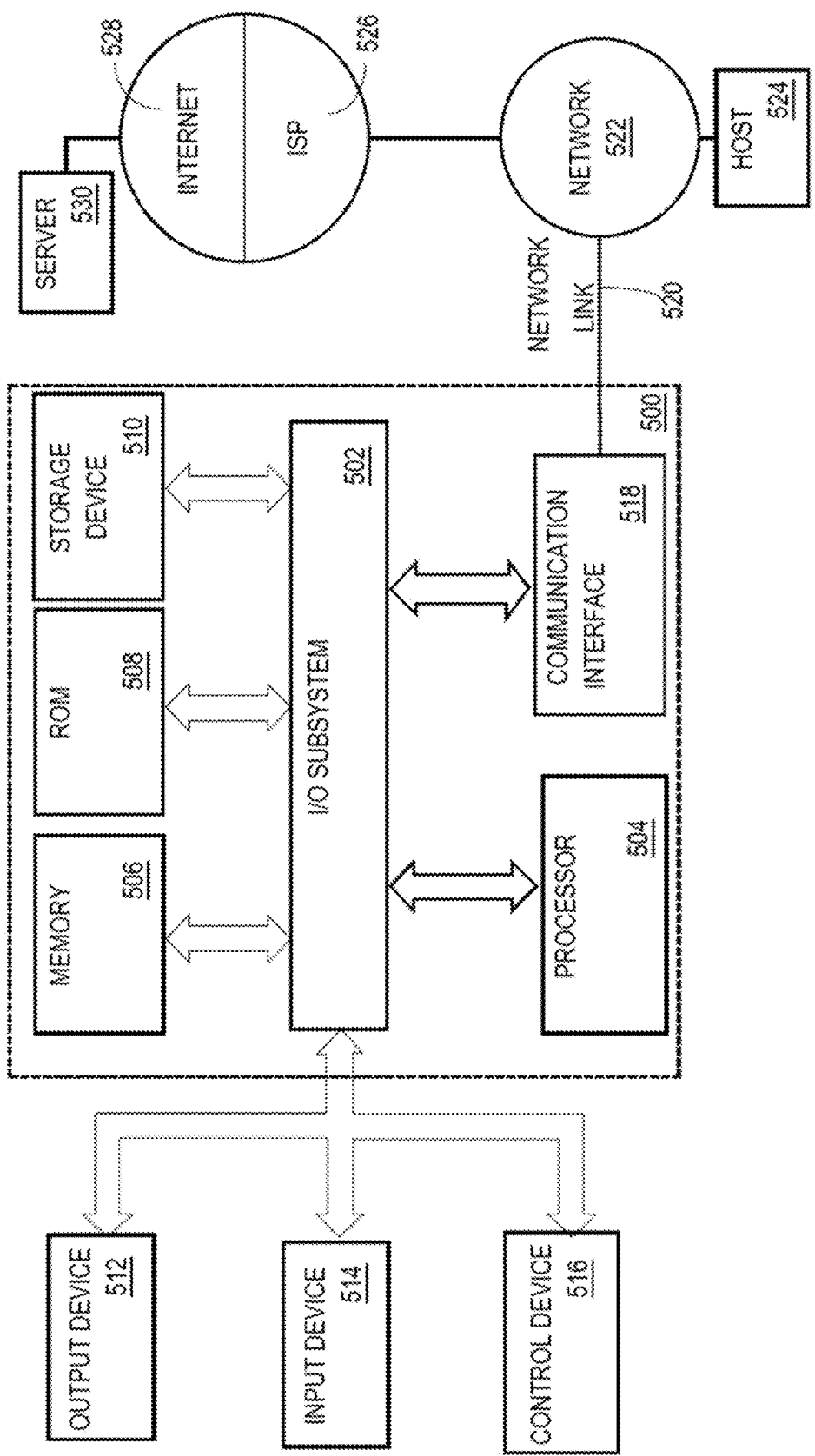
FIG. 5 is a block diagram that illustrates a computer system upon which an embodiment of the present invention may be implemented.

Messaging interfaces 130, 132 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices 110, 140, 142, 150, 160 are shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142, 150, 160.

Message processing computer(s) 150 are programmed to operate message transfer application 152. Message transfer application 152 when executed by a processor is programmed to control the transmission of electronic communications between upstream computers and downstream computers, such as computing devices 140, 142, on network 120. Portions of message transfer application 152 may be implemented as or in combination with a text messaging service such as SMS (Short Message Service) or MMS (Multimedia Messaging Service), or as a Voice over Internet (VOIP) server or as a mail server of a public or private electronic mail or messaging system. Portions of message transfer application may be implemented in an online service, such as a social network service, in which electronic messages may include notifications, recommendations, shares, comments, news feeds, tweets, and/or connection requests. Message transfer application 152 may include various message scanning and filtering technologies, such as virus scanners, intrusion detection systems, and/or spam filters.

In an embodiment, message transfer application 152 is programmed to use stateless security scanning to scan messages as they are in transit from an upstream computer to one or more downstream computers. When the message scanner detects an incoming message, the message is processed by business email compromise (BEC) detection computer(s) 160 as described below.

After a message is processed by business email compromise (BEC) detection computer(s) 160, message transfer application 152 is programmed to receive output from business email compromise (BEC) detection computer(s) 160 and determines, based on the output, how to further process the message. For example, message transfer application 152 may be programmed to determine to modify, delay, re-route, or block the message, or forward the message to a next-hop router or other downstream computer or element of network infrastructure gear.

In an embodiment, message transfer application 152 is programmed to execute a rule or set of rules to map the output of business email compromise (BEC) detection computer(s) 160 to an appropriate network instruction using, for example, a mapping table or heuristics, and then causes the network instruction that corresponds to the output to be implemented on network 120. Implementation can be performed by a network device such as a mail server or a router executing the network instruction to drop the message, transmit configuration data to a firewall or router, reroute the message to a different machine, or allow the message to proceed to its intended destination.

The network instruction output by message transfer application 152 in response to output produced by business email compromise (BEC) detection computer(s) 160 can include a network command to modify, delay, block, -re-route or forward a message to downstream routers, message transfer agents or other network nodes. An instruction to modify a message may include an instruction to add a notification flag to the message before sending the message downstream; for example, a "SUSPECTED PHISHING" notification added to the subject line of the message, or to re-direct or quarantine the message containing the link, for example by routing the message to a honeynet or quarantine services.

BEC detection computer(s) 160 is programmed to determine whether messages scanned by message processing computer(s) 150 are business email compromise attack messages and provide output to message processing computer(s) 150. For example, if BEC detection computer(s) determines that a particular message is a BEC attack message, BEC detection computer(s) is programmed to provide output to message processing computer(s) 150 indicating that the particular message is a BEC attack message. Examples of particular technologies that may be used to implement processes and flows performed by BEC detection computer(s) 160 are described in greater detail below with reference to FIG. 3 and FIG. 4. The processes shown in FIG. 3 and FIG. 4 and described below are not limited to BEC detection. Portions of the processes shown in FIG. 3 and FIG. 4 may be used to perform other types of phishing detection or spoof detection.

2.2 Example Messaging System Architecture

Figure 2:
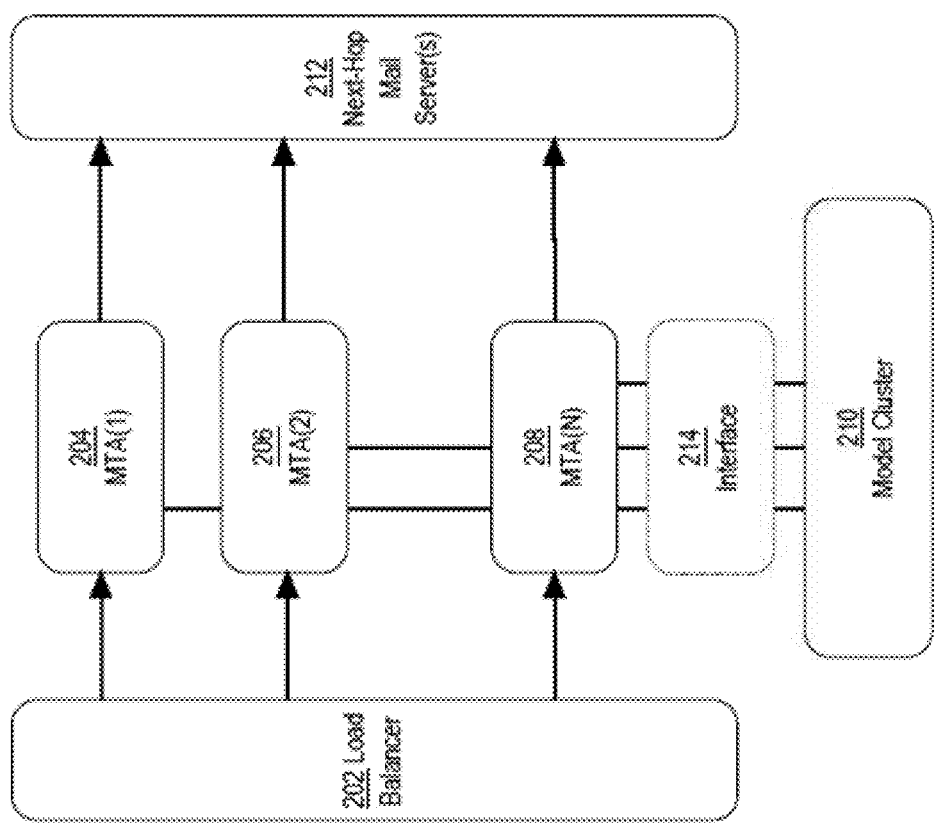
FIG. 2 is a schematic depiction of a portion of the computing system of FIG. 1, in an embodiment.

FIG. 2 illustrates an embodiment of a system architecture in which aspects of the disclosed technologies may be implemented. A network 200 includes network devices 202, 212. Network device 202 is illustratively a load balancer while network device 212 is a next-hop server such as a mail server. Network 200 may be a portion of network 120, described above.

Any number N of message transfer applications (also called agents) (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 is programmed to perform stateless security scanning of messages received from network device 202 and prior to transmission of the messages to network device 212.

In an embodiment, interface 214 is interposed between the MTAs 204, 206, 208 and a model cluster 210. However, portions of interface 214 may be implemented within an MTA 204, 206, 208. An example of interface 214 is an application program interface (API).

Model cluster 210 may be implemented in main memory, disk storage, or other digital electronic storage on message processing computer(s) 150 and/or business email compromise (BEC) detection computer(s) 160 and may include one or more machine learning-based model(s) that may be selectively engaged and disengaged by interface 214 for use in connection with the stateless scanning performed by the MTAs 204, 206, 208. In an embodiment, model cluster 210 is programmed with machine learning-based model(s) used by MTAs 204, 206, 208 for many different types of message classification, including classification as spam, classification as legitimate message, classification as phishing, spoofing, or malicious, and classification according to characteristics of the message text, such as any one or more of the message text characteristics described herein. In an embodiment, the computer(s) 150, 160 used to host model cluster 210 are stateless model servers.

Models in model cluster 210 are programmed using, for example, one or more text-based classification modeling approaches, such as logistic regression, random forests, gradient-boosted trees, neural networks, and deep neural networks. For instance, model cluster 210 may include models created using different modeling approaches, or may include models all created using the same modeling approach but with different training data.

Interface 214, when executed by a processor, is programmed to control the selective engagement of business email compromise (BEC) detection computer(s) 160 by message processing computer(s) 150 in tasks performed by, or requested by, message transfer application 152. The programming of interface 214 manages and facilitates electronic communications of data and instructions between message processing computer(s) 150 and business email compromise (BEC) detection computer(s) 160 during the handling by message transfer application 152 of electronic messages and their respective attachments, for example messages that are being transmitted from computing device 140 to computing device 142, or from computing device 142 to computing device 140, over network 120. Interface 214 is shown as a separate component in FIG. 2 but all or portions of interface 214 may be implemented as part of message transfer application 152. Alternatively, or in addition, some portions of interface 214 may be implemented on business email compromise (BEC) detection computer(s) 160.

2.3 Example of BEC Detection Architecture

In an embodiment, the above-described technologies are used to, automatically and actively, scan electronic messages for BEC attacks prior to transmission of the messages from a network to a downstream or recipient computer. Embodiments may be programmed to execute real-time responses by admitting or blocking a message containing a BEC attack immediately after the message is initially received.

Figure 3:
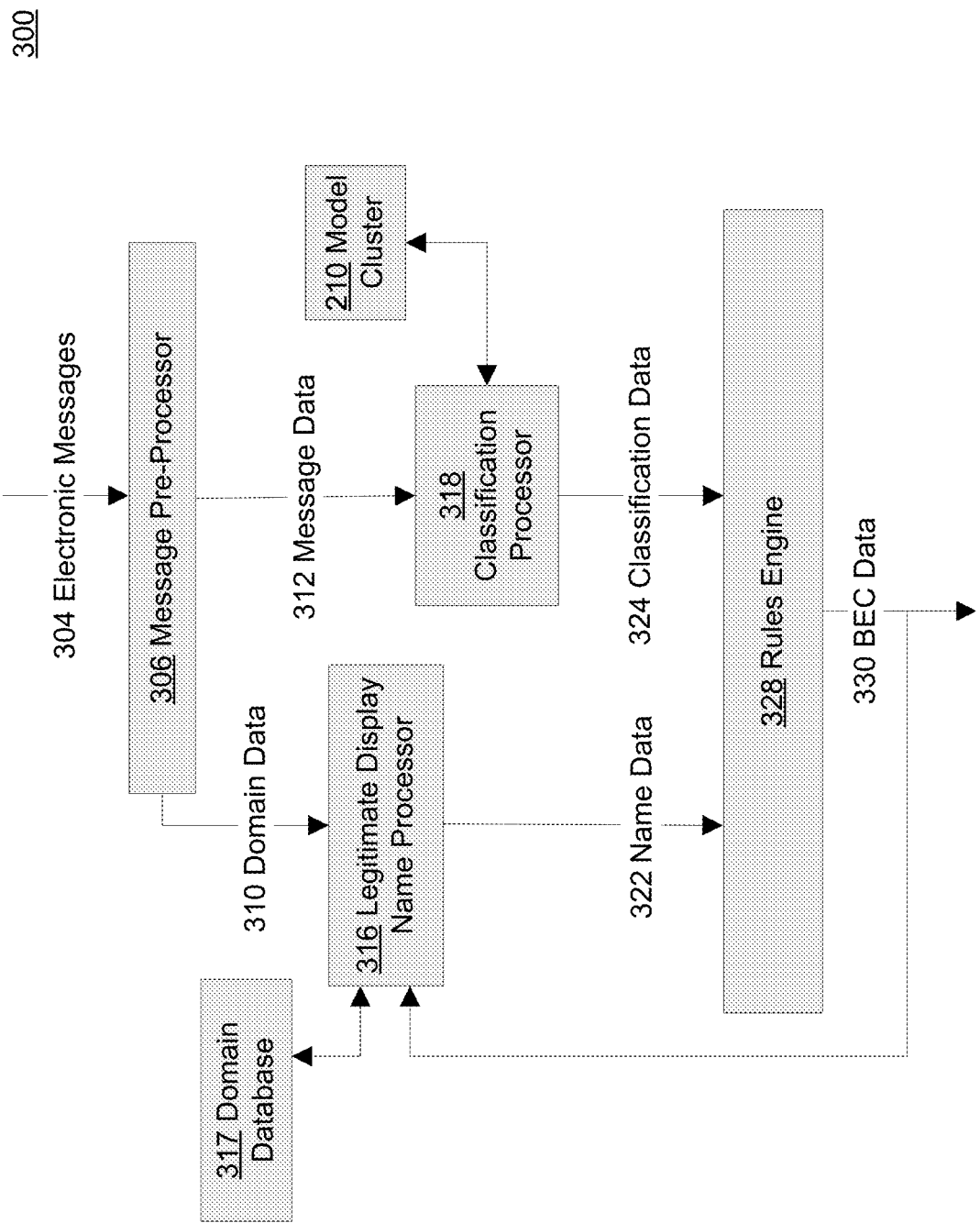
FIG. 3 is a diagram that depicts a process, in an embodiment.

FIG. 3 illustrates a system architecture and flow diagram that can be implemented by portions of the computing system of FIG. 1. FIG. 3 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Flow 300 may be implemented using a single entity or program or by multiple entities or programs, including, for example, a client-side mail or messaging application and a server. The operations shown in FIG. 3 can be implemented using processor-executable instructions that are stored in computer memory. For purposes of providing a clear example, the operations of FIG. 3 are described as performed by one or more computing device(s) 110, 140, 142, 150, 160, which may be individually or collectively referred to as simply 'computing system 100.' Also for clarity, the operations of FIG. 3 are described as evaluating a single message. It should be understood, however, that flow 300 can be used to evaluate any number of messages.

2.4 Message Pre-Processor

Message pre-processor 306 is programmed to scan and pre-process an arbitrary number N of electronic messages 304, where N is a positive integer, over a time interval, such as a positive number of seconds, minutes, days, weeks, or months. Electronic messages 304 are part of network traffic 302 flowing between sending computers and recipient computers on a network, such as network 120. Message pre-processor 306 is programmed to extract domain data 310 and message data 312 from individual electronic messages 304. Domain data 310 may include data corresponding to display name, email address, and email domain of the senders of the electronic messages, such as <John Doe> johndoe@baysideslegal.com. Message data 312 may include data corresponding to text extracted from individual electronic messages, for example, n-grams extracted from the subject line, the message body, the contents of an attachment, or any combination of the foregoing.

Examples of software used by or as message pre-processor 306 in some embodiments include open source libraries such as TIKA (available from The Apache Foundation), PyRTF (available on SourceForge from oubiwann and scusack), POI (available from The Apache Foundation), OLE-TOOLS (available on GitHub from Philippe Lagadec), or any open source or commercial software product that is capable of extracting data from electronic messages.

Individual electronic messages of electronic messages 304 are processed individually by message pre-processor 306. The data extracted from each individual message, e.g., domain data 310 and message data 312, are processed by legitimate display name processor 316 and classification processor 318, respectively.

2.5 Legitimate Display Name Processor

Legitimate display name processor 316 is programmed to creates, stores, and maintains a set of domain data stored in a domain database 317 based on domain data 310 extracted from network traffic 302 over a time interval. In an embodiment, legitimate display name processor 316 is programmed to extract triples of display name, email address, and email domain (herein referred to as a "Triple") from the domain data 310 and tracks each unique Triple by assigning a name score, or a probability value, indicating the probability of the Triple being associated with a legitimate sender computer system. Identifications of Triples and corresponding name scores are individually stored as domain data and maintained as units, records, or other organized data entities in the domain database 317. For each processed message, the legitimate display name processor 316 is programmed to output name data 322 that may include the domain data 310 and name score.

In an embodiment, when an electronic message 304 is received by the system and is associated with a Triple that is observed for the first time, the Triple is assigned a default name score. For example, a newly-observed Triple may be assigned a name score of 50%, indicating the probability of the Triple being legitimate. For each message 304 processed by the system, the name score of the Triple associated with the message 304 may be considered to evaluate whether the message is a BEC attack, e.g., whether the message 304 is a phishing attempt, spam, malicious, suspicious, or benign. In an embodiment, for each Triple stored in the domain database 317, the associated name score is updated based on frequency counting and/or other detection algorithms. For example, if the electronic message 304 associated with a Triple is ultimately evaluated as being legitimate, the legitimate display name processor 316 may update the name score by raising it to indicate that the system is more confident that messages associated with the Triple are legitimate. Alternatively, if the electronic message 304 received by the system is evaluated as being illegitimate, the legitimate display name processor 316 may update the name score by lowering it to indicate that the system is less confident that messages associated with the Triple are legitimate. Accordingly, a Triple that is associated with a high frequency of legitimate messages will likely have a high name score, whereas a Triple that is associated with a low frequency of legitimate message will likely have a low name score. All the foregoing logic may be implemented using stored program control in legitimate display name processor 316 or instructions that it executes. The legitimate display name processor 316 may be implemented or programmed as part of one or more MTAs 208 or as part of interface 214, in some embodiments.

In an embodiment, legitimate display name processor 316 is programmed to maintain reputation scores for email domains and/or IP addresses in the domain database 317 separately from the name scores of Triples. Similar to the names scores of the Triples, reputation scores for newly-observed email domains or IP addresses may be assigned a default reputation score, then the reputation score may be updated based on frequency counting and/or other detection algorithms. For example, if messages 304 that are determined to be legitimate are received from a particular sending domain, or a particular IP address, at a high enough frequency that satisfies a frequency count criterion, then the reputation score associated with that sending domain, or IP address, may be increased to indicate that the owner of the email domain/IP address is a legitimate business partner of the entity corresponding to the recipient computer system.

2.6 Classification Processor

A classification processor 318 is programmed to process the message data 312 that is extracted from the individual electronic message 304. In an embodiment, the classification processor 318 is a cluster of binary classifiers each of which has a corresponding machine-learned model stored in model cluster 210, where the corresponding model has been trained to recognize, based on message data, a different characteristic of electronic messages. Examples of message characteristics that may be detected by the classification processor 318 include but are not limited to a message containing, or being associated with: an invoice, a financial communication, a communication related to a banking account, and/or an automated clearinghouse (ACH) communication.

Models associated with the classification processor 318 have been trained using supervised machine learning and labeled training data representative of particular message characteristics, in some embodiments. For instance, each model may be trained with positive and negative labeled examples of message data representing a particular message characteristic. Training the model may be performed using, for example, a logistic regression algorithm. Other text-based classification modeling approaches, such as random forests, gradient-boosted trees, neural networks, and deep neural networks, can be used to create the models alternatively or in addition to logistic regression and other supervised machine learning approaches.

Once the models have been trained, the classification processor 318 is programmed to receive the message data 312 as input. The message data 312 may comprise a set of features that have been extracted from a particular electronic message being analyzed. The classification processor 318 is programmed to compute a probability that the electronic message has the particular message characteristic corresponding to a particular model. The classification processor 318 may be programmed to compare the probability value to a threshold value to determine whether the probability is high enough to result in a reliable classification. For example, in an implementation that has three models, including a first model configured to detect invoices, a second model configured to detect banking account communications, and a third model configured to detect ACH data, classification data 324 may include a set of values, such as binary values where 1 indicates a positive classification and 0 indicates a negative classification. The one or more values output by the classification processor 318 and included in classification data 324 may be determined and evaluated individually or collectively in any combination, depending on the requirements of a particular implementation using different programming of the classification processor.

Examples of features that may be extracted from electronic messages and included in the set of features include n-grams, such as bi-grams and tri-grams, and embeddings, or a combination of thereof. More generally, a "feature" or "text feature" as used herein may refer to a sequence, group(s), or some combination of n-grams (e.g., text) extracted from electronic messages. A feature or a text feature may also refer to a numerical representation of a portion of text of an electronic message. For example, a sequence of text, such as "routing number" may be represented by a numerical value or a sequence of numerical values that embody semantic and/or syntactic characteristics of the text. Feature extraction can be performed apart from or as part of the classification process.

If the probability value computed by a particular model of the classification processor 318 meets or exceeds the threshold value, the classification processor 318 may be programmed to determine that the characteristic that the model is configured to detect is present in the electronic message. If the probability value computed by a particular model does not meet or exceed the threshold value, the classification processor 318 may be programmed to determine that the characteristic that the model is configured to detect is not present in the electronic message. The threshold values used by the models of the classification processor 318 are each independently configurable according to the requirements of a particular implementation.

The classification processor 318 is programmed to output classification data 324 for each message 304 that it processes. For example, in an implementation that has three models, including a first model for detecting invoices, a second model for detecting banking account communications, and a third model for detecting ACH data, classification data 324 may include a set of values, such as binary values where 1 indicates a positive classification and 0 indicates a negative classification. The one or more values output by the models of the classification processor and included in classification data 324 may be determined and evaluated individually or collectively in any combination, depending on the requirements of a particular implementation.

2.7 Rules Engine

For an individual message of electronic messages 304, rules engine 328 is programmed to receive input name data 322 and classification data 324. Rules engine 328 is programmed to apply a set of heuristics to these inputs, then outputs BEC data 330. The heuristics contained in rules engine 328 may be manually configured and/or configured by an automated process, in accordance with the requirements of a particular implementation. In some embodiments, rules engine 328 may be configured as an expert system.

BEC data 330 indicates a final determination as to whether a particular message 304 is, or is not, a phishing attempt, spoofed email, or business email compromise email. Rules engine 328 is programmed to provide BEC data 330 for use by a downstream process, processor, device, system or network. For example, BEC data 330 may be provided to one or more MTAs 208 for use in determining whether to block, re-route, modify, or delay transmission of the message to the recipient computer system.

3. Example of Comprise Detection System Process

Figure 4:
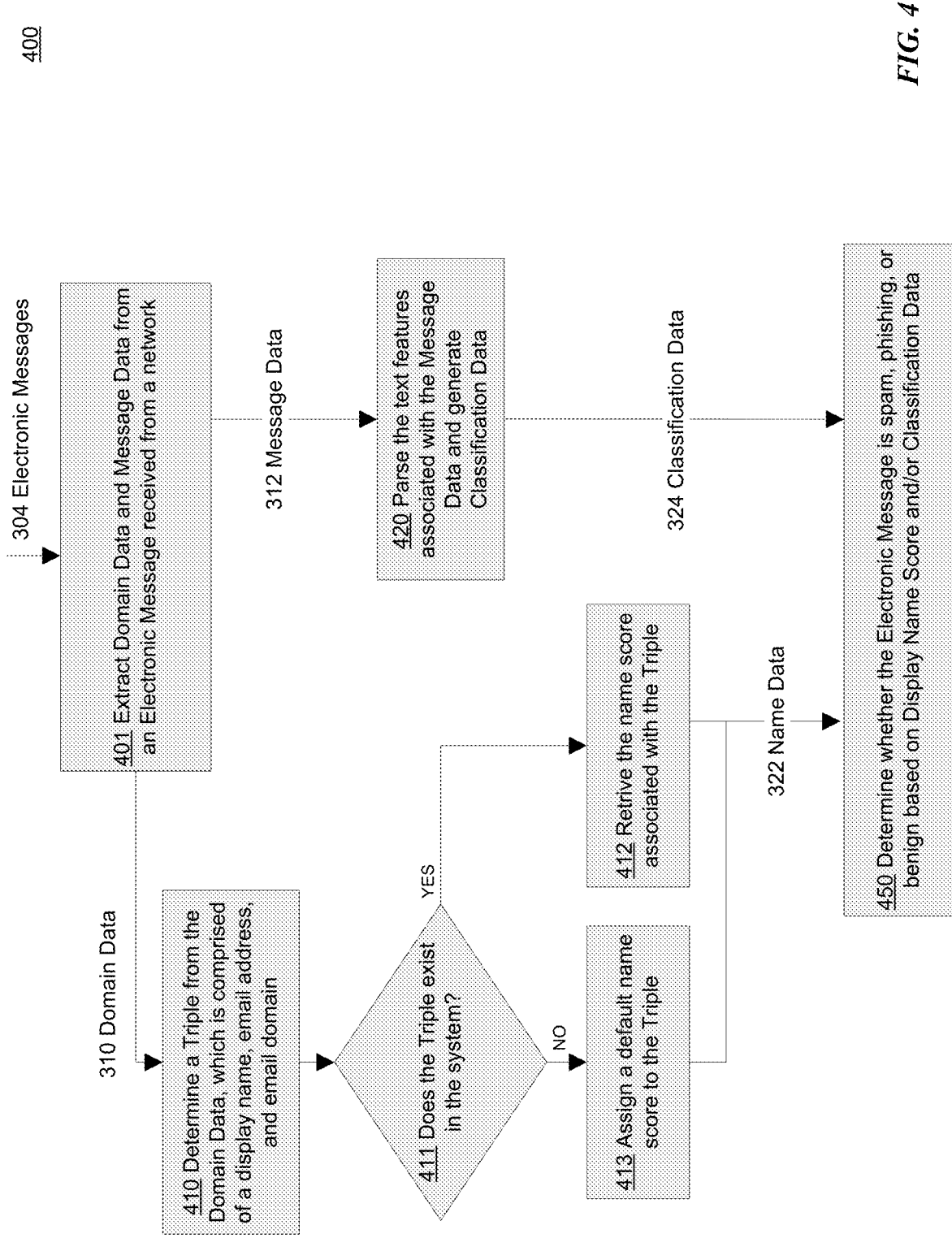
FIG. 4 is a diagram that depicts a process, in an embodiment.

In an embodiment, the above-described technologies are used to, automatically and actively, scan electronic messages prior to transmission of the messages to a downstream computer. To that end, FIG. 4 illustrates a process that can be performed, for example, by computing system 100. FIG. 4 depicts an embodiment of a flow 400 for determining whether a message 304 is legitimate or a BEC attack, e.g., a phishing attempt, spoofed email, or business email compromise email. Flow 400 may be performed by a single entity or program or by multiple entities or programs, including, for example, a client-side mail or messaging application and a server.

The operations of flow 400 as shown in FIG. 4 can be implemented using processor-executable instructions that are stored in computer memory. For purposes of providing a clear example, the operations of FIG. 4 are described as performed by one or more computing device(s) 110, 140, 142, 150, 160, which may be individually or collectively referred to as simply 'computing system 100.' Also for clarity, the operations of FIG. 4 are described as evaluating a single message. It should be understood, however, that flow 400 can be used to evaluate any number of messages. In some embodiments, the operations of the computing system 100 described below, including the operation of the legitimate display name processor 316 and the classification processor 218, may be implemented as part of one or more MTAs 208 or as part of interface 214.

In operation 401, the message pre-processor 306 extracts domain data 310 and message data 312 from an electronic message sent by a sender computer system directed to a recipient computer system. In an embodiment, an MTA or other element that originally received the electronic message from the network or other networking gear is programmed to immediately signal message pre-processor 306, in real time as soon as a message is received, to initiate execution. In this manner, embodiments are programmed to execute real-time inspection and action on messages, and can form part of a highly-scaled system that is capable of acting on thousands to millions of messages per second, depending on the capabilities of the base computing hardware.

In operation 410, the legitimate display name processor 316 processes domain data 310 and extracts the display name, email address, and email domain associated with the sender computer system. Then, a Triple is determined which is comprised of the extracted display name, email address, and email domain, for example, <John Doe> johndoe@baysidelegal.com. A Triple is an identifier assigned to each unique combination of display name, email address, and email domain. Each Triple is assigned a name score, or probability value, that indicates the probability of the Triple being associated with a legitimate sender computer system. Triples and corresponding name scores are individually stored as domain data and maintained in the domain database 317.

In operation 411, after a Triple is determined from the domain data 310 of the message 304, the legitimate display name processor 316 accesses the domain database 317 to determine whether the Triple has been observed previously, in which case, name score of the Triple would already exist in the domain database 317, or whether it is a newly-observed Triple without a previously-assigned name score.

If the Triple exists in the domain database 317, in operation 412, the legitimate display name processor 316 retrieves the name score associated with the Triple. Then, the legitimate display name processor 316 transmits name data 322 to the rules engine 327. The name data 322 includes both the domain data 310 and the retrieved name score. In some embodiments, the name data 322 further include a score indicating how legitimate a sending email domain is, distinct from the name score associated with a Triple.

If the Triple does not exist in the domain database 317, in operation 413, the legitimate display name processor 316 assigns a default name score to the Triple. For example, a newly-observed Triple may be assigned a default name score of 50%, which gets stored in the domain database 317. Then, the legitimate display name processor 316 transmits name data 322 to the rules engine 327. The name data 322 includes both the domain data 310 and the newly-assigned name score.

In operation 420, the classification processor 318 processes the message data 312 and parses the text features associated with the message data 312 to generates classification data 324, which, as described above, indicate characteristics the message data 312 is associated with, e.g., an invoice, a financial communication, a communication related to a banking account, and/or an automated clearinghouse (ACH) communication.

In operation 450, the rules engine 327 determines whether the electronic message 304 is associated with a phishing attack, malicious, suspicious, spam, or benign based on the name data 322 and/or classification data 324. In some embodiments, the rules engine 327 considers other factors, such as reputation scores for IP addresses or email domain associated with the sender computer system. The rules engine 328 applies a set of heuristics to these inputs and outputs BEC data 330. For example, if an electronic message 304 is associated with a Triple with a name score of 20% and the message data 312 extracted from the message 304 is classified as a banking account communication, the rules engine 327 may determine that the message 304 is associated with a BEC attack. If the rules engine 327 determines that the message is associated with a BEC attack, the system programmatically modifies the subject line of the message 304, or adds an additional header to the message 304, with a status indicating that the message 304 is associated with a BEC attack, e.g., a phishing attack, malicious, suspicious, or spam. If the rules engine 327 determines that the message 304 is legitimate, e.g., benign, the system programmatically modifies the subject line of the message 304, or adds an additional header to the message 304, with a status indicating that the message 304 is not associated with a BEC attack. In an embodiment, the system programmatically evaluates whether to transmit, delay, block, modify, or re-route the message 304 based on the status of the message 304. In other embodiments, the system programmatically transmits the message 304 to a downstream system(s) to allow the downstream system(s) to evaluate whether to transmit, delay, block, modify, or re-route the message 304 based on the status of the message 304.

In some embodiment, as shown in FIG. 3, the rules engine 328 may provide the BEC data 330 to the legitimate display name processor 316 so the name score of the Triple can be updated to include the latest determination of whether the message 304 associated with the Triple was legitimate.

4. Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

5. Extensions and Alternatives; Benefits and Improvements

Embodiments provide the benefits and improvements of detecting BEC email attacks that otherwise have escaped detection with prior technology. Consequently, a mail transfer agent, firewall, email server, or other computing hardware that is protected according to the disclosure will use fewer resources including CPU cycles, memory, storage, and/or network bandwidth by not admitting malicious or fraudulent emails into networks, subnets, servers, or endpoints.

The disclosure to this point has explained a BEC detection architecture by which computers can detect BEC attacks that are engineered to appear as authentic as possible. In one aspect, the BEC detection architecture uses a novel approach of determining a unique identifier based on display name, email address, and email domain associated with the sender computer system. Given that BEC attacks, such as domain spoofing, can be hard to detect, particularly if the email traffic includes frequent, routine, legitimate email exchanges with individuals with familiar email domain, the system generates, builds, and/or maintains a database with unique identifiers associated with messages, allowing the system to programmatically track messages transmitted by the various sender computer systems in the network. Moreover, the system generates and/or maintains a name score for each unique identifier, updating the name score by increasing it, or decreasing it, based on certain events associated with the corresponding unique identifier. For example, if multiple messages associated with a particular unique identifier is determined as being legitimate (e.g., not a BEC attack), the system may increase the name score corresponding to the unique identifier. The system then uses this name score to evaluate whether messages transmitted by the unique identifier are legitimate or BEC attacks. The systemic approaches described above of generating, building, and maintaining a database of unique identifiers with corresponding name scores allows computers and servers to programmatically determine the likelihood of a particular message being a BEC attack in large volume of email traffic.

The disclosed BEC detection architecture further provides technical improvements in detecting BEC attacks by combining the computer-implemented techniques associated with unique identifiers (e.g., Triples) and corresponding name scores and computer-implemented techniques associated with a classification processor that determines the characteristics of messages (e.g., an invoice, a financial communication, a communication related to a banking account or ACH). This allows the system to more accurately evaluate, programmatically, whether a particular message associated with a particular Triple has characteristics that are expected to have. The combination of these techniques allows detection of highly sophisticated BEC attacks that may be too difficult to detect by the implementation of any one technique, thereby reducing the risk of obtaining false positive or false negative results.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps. Throughout this disclosure, an element that is identified by a noun followed by the letter s in parentheses, as in (s), indicates that one or more of the element may be used in various embodiments.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of detecting compromised digital electronic messages, the method comprising, executed by one or more business email compromise (BEC) detection computers:
   receiving, from a digital electronic computer network, a digital electronic message that is directed to a recipient computer from a sender computer;
   obtaining domain data and message data from the digital electronic message and storing the domain data and message data, the domain data comprising a triple identifier associated with the sender computer, the triple identifier being comprised of a display name, an email address, and an email domain associated with the sender computer, the message data comprising a plurality of text features;
   comparing the triple identifier associated with the sender computer with one or more digitally stored triple identifiers in a domain database associated with the one or more BEC detection computers;
   determining, in response to comparing the triple identifier with the one or more stored triple identifiers, a name score for the triple identifier indicating a probability that the digital electronic message associated with the sender computer is compromised;
   parsing the plurality of text features of the message data;
   inputting the plurality of text features of the message data into a plurality of classifiers, each classifier corresponding to a respective particular message type and having been machine-learned to determine a probability that a digital electronic message is associated with that respective particular message type;
   determining, based on output of the plurality of classifiers, a message type of the digital electronic message; and
   determining whether the digital electronic message is a BEC attack based on the name score for the triple identifier associated with the sender computer and the message type of the digital electronic message.

2. The method of claim 1, the determining the name score for the triple identifier comprising:
   identifying a stored triple identifier of the one or more stored triple identifiers that matches the triple identifier associated with the sender computer;
   retrieving a name score associated with the identified stored triple identifier;
   assigning the retrieved name score to the triple identifier associated with the sender computer.

3. The method of claim 1, the determining the name score for the triple identifier comprising:
   determining that the triple identifier associated with the sender computer does not match any of the one or more stored triple identifiers in the domain database;
   assigning a default name score to the triple identifier associated with the sender computer.

4. The method of claim 1, the one or more stored triple identifiers in the domain database each being associated with a name score generated based in part on a frequency count of legitimate electronic messages received from the stored triple identifier.

5. The method of claim 1, the particular message type of each of the plurality of classifiers being associated with one of: an invoice, a financial communication, a communication related to a banking account, or an automated clearinghouse (ACH) communication.

6. The method of claim 1, the determining whether the digital electronic message is a BEC attack being further based on one or more of: reputation scores associated with an IP address of the sender computer, or reputation scores associated with the email domain associated with the sender computer.

7. The method of claim 1, further comprising, modifying the digital electronic message to include a status indicating that the digital electronic message is a BEC attack.

8. The method of claim 7, further comprising, instructing a message transfer agent to execute, based on the status indicating that the digital electronic message is a BEC attack, at least one of: modify the digital electronic message before relaying the digital electronic message to the recipient computer, delay the digital electronic message, re-route the digital electronic message, or block transmission of the digital electronic message to the recipient computer.

9. An apparatus comprising:
   one or more non-transitory computer-readable storage media comprising instructions which, when executed by one or more processors of one or more business email compromise (BEC) detection computers, cause the one or more processors to perform operations comprising:
   receiving, from a digital electronic computer network, a digital electronic message that is directed to a recipient computer from a sender computer;
   obtaining domain data and message data from the digital electronic message and storing the domain data and message data, the domain data comprising a triple identifier associated with the sender computer, the triple identifier being comprised of a display name, an email address, and an email domain associated with the sender computer, the message data comprising a plurality of text features;
   comparing the triple identifier associated with the sender computer with one or more digitally stored triple identifiers in a domain database associated with the one or more BEC detection computers;
   determining, in response to comparing the triple identifier with the one or more stored triple identifiers, a name score for the triple identifier indicating a probability that the digital electronic message associated with the sender computer is compromised;
   parsing the plurality of text features of the message data;
   inputting the plurality of text features of the message data into a plurality of classifiers, each classifier corresponding to a respective particular message type and having been machine-learned to determine a probability that a digital electronic message is associated with that respective particular message type;

determining, based on output of the plurality of classifiers, a message type of the digital electronic message; and determining whether the digital electronic message is a BEC attack based on the name score for the triple identifier associated with the sender computer and the message type of the digital electronic message.

10. The apparatus of claim 9, the determining the name score for the triple identifier comprising:

identifying a stored triple identifier of the one or more stored triple identifiers that matches the triple identifier associated with the sender computer;

retrieving a name score associated with the identified stored triple identifier;

assigning the retrieved name score to the triple identifier associated with the sender computer.

11. The apparatus of claim 9, the determining the name score for the triple identifier comprising:

determining that the triple identifier associated with the sender computer does not match any of the one or more stored triple identifiers in the domain database;

assigning a default name score to the triple identifier associated with the sender computer.

12. The apparatus of claim 9, the one or more stored triple identifiers in the domain database each being associated with a name score generated based in part on a frequency count of legitimate electronic messages received from the stored triple identifier.

13. The apparatus of claim 9, further comprising instructions which, when executed by the one or more processors, cause the one or more processors to further perform operations comprising instructing, in response to determining that the electronic message is a BEC attack, a message transfer agent to execute at least one of: modify the digital electronic message before relaying the digital electronic message to the recipient computer, delay the digital electronic message, re-route the digital electronic message, or block transmission of the digital electronic message to the recipient computer.

14. A system comprising:

one or more business email compromise (BEC) detection computers that include one or more processors and one or more non-transitory storage media storing instructions which, when executed by the one or more processors, cause the one or more processors to perform operations including:

receiving, from a digital electronic computer network, a digital electronic message that is directed to a recipient computer from a sender computer;

obtaining domain data and message data from the digital electronic message and storing the domain data and message data, the domain data comprising a triple identifier associated with the sender computer, the triple identifier being comprised of a display name, an email address, and an email domain associated with the sender computer, the message data comprising a plurality of text features;

comparing the triple identifier associated with the sender computer with one or more digitally stored triple identifiers in a domain database associated with the one or more BEC detection computers;

determining, in response to comparing the triple identifier with the one or more stored triple identifiers, a name score for the triple identifier indicating a probability that the digital electronic message associated with the sender computer is compromised;

parsing the plurality of text features of the message data;

inputting the plurality of text features of the message data into a plurality of classifiers, each classifier corresponding to a respective particular message type and having been machine-learned to determine a probability that a digital electronic message is associated with that respective particular message type;

determining, based on output of the plurality of classifiers, a message type of the digital electronic message; and determining whether the digital electronic message is a BEC attack based on the name score for the triple identifier associated with the sender computer and the message type of the digital electronic message.

15. The system of claim 14, the determining the name score for the triple identifier comprising:

identifying a stored triple identifier of the one or more stored triple identifiers that matches the triple identifier associated with the sender computer;

retrieving a name score associated with the identified stored triple identifier;

assigning the retrieved name score to the triple identifier associated with the sender computer.

16. The system of claim 14, the determining the name score for the triple identifier comprising:

determining that the triple identifier associated with the sender computer does not match any of the one or more stored triple identifiers in the domain database;

assigning a default name score to the triple identifier associated with the sender computer.

17. The system of claim 14, the one or more stored triple identifiers in the domain database each being associated with a name score generated based in part on a frequency count of legitimate electronic messages received from the stored triple identifier.

* * * * *